US005246620A

United States Patent [19]

Gethöffer et al.

[11] Patent Number: 5,246,620

[45] Date of Patent: Sep. 21, 1993

[54] STABLE PEROXYCARBOXYLIC ACID GRANULES

[75] Inventors: Hanspeter Gethöffer, Frankfurt am Main; Gerd Reinhardt, Kelkheim/Taunus; Gerhard Nöltner, Frankfurt am Main; Christoph Porz, Meckenheim, all of Fed. Rep. of Germany

[73] Assignee: Hoechst Aktiengesellschaft, Frankfurt, Fed. Rep. of Germany

[21] Appl. No.: 687,236

[22] Filed: Apr. 18, 1991

[30] Foreign Application Priority Data

Apr. 21, 1990 [DE] Fed. Rep. of Germany ....... 4012769

[51] Int. Cl.[5] .............................................. C01B 15/10

[52] U.S. Cl. .......................... 252/186.26; 252/186.42; 252/95

[58] Field of Search ....................... 252/186.26, 186.42

[56] References Cited

U.S. PATENT DOCUMENTS

| | | | |
|---|---|---|---|
| 4,009,113 | 2/1977 | Green et al. | 252/95 |
| 4,759,956 | 7/1988 | Amer et al. | 427/213 |
| 4,781,984 | 11/1988 | Cavitt et al. | 428/418 |
| 4,921,631 | 5/1990 | Gradwell et al. | 252/186.38 |
| 5,061,807 | 10/1991 | Gethoffer et al. | 548/473 |
| 5,091,106 | 2/1992 | Jacobs et al. | 252/186.26 |
| 5,126,418 | 6/1992 | Porz et al. | 526/234 |

FOREIGN PATENT DOCUMENTS

| | | |
|---|---|---|
| 2034517 | 7/1991 | Canada . |
| 0200163 | 11/1986 | European Pat. Off. . |
| 0349940 | 1/1990 | European Pat. Off. . |
| 0437843 | 12/1990 | European Pat. Off. . |
| 4001420 | 7/1991 | Fed. Rep. of Germany . |

*Primary Examiner*—Richard D. Lovering
*Assistant Examiner*—Joseph D. Anthony
*Attorney, Agent, or Firm*—Connolly and Hutz

[57] ABSTRACT

Stable peroxycarboxylic acid granules, consisting essentially of (1) an imidoperoxycarboxylic acid or a salt thereof of the formula

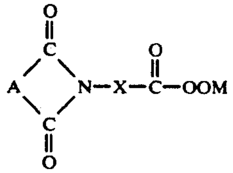

wherein A is a group of the formulae

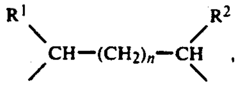

,

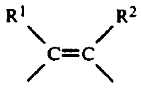

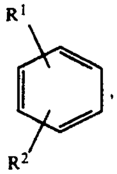

, 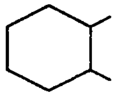 or

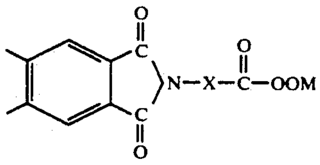

n is the number 0, 1 or 2, $R^1$ is hydrogen, chlorine, bromine, $C_1$-$C_{20}$-alkyl, $C_1$-$C_{20}$-alkenyl, aryl or alkylaryl, $R^2$ is hydrogen, chlorine, bromine or a group of the formula $—SO_3M$, $—CO_2M$ or $—OSO_3M$, M is hydrogen, an alkali metal or ammonium ion or one equivalent of an alkaline earth metal ion and X is $C_1$-$C_{19}$-alkylene or arylene, and (2) an inorganic sulfate and/or phosphate salt and/or a nonoxidizable surfactant as granulation auxiliary and a copolymer based on alkenylaminomethylenephosphonic acids as a film-forming coating substance.

14 Claims, No Drawings

STABLE PEROXYCARBOXYLIC ACID GRANULES

The present invention relates to concentrated bleaching active ingredients in granulated form which have a long shelf life and contain solid imidoperoxycarboxylic acids as bleaching components. The granules according to the invention can be used as bleach additives or oxidizing agents in detergents, cleaning agents and disinfectants.

Inorganic peroxy salts, such as sodium perborate or percarbonates have long been known as bleach additives in detergents. However, they display maximum bleaching power only at temperatures above 60° C. A number of organic compounds have been described for their activation, said compounds liberating a peroxycarboxylic acid with hydrogen peroxide during the washing process. Said peroxycarboxylic acid has a bleaching effect even at temperatures below 60° C. The most well known example of this is tetraacetylethylenediamine (TAED).

However, a number of peroxycarboxylic acids for direct use in detergents have also recently been described.

However, the problem both with the activators and with the preproduced peroxycarboxylic acids is their short shelf life in alkaline detergent formulations. In the case of these substances, an adequate shelf life can be achieved only by means of a suitable granulation or coating process.

For example, carboxymethylcellulose or ethoxylates of relatively long-chain alcohols are known as granulation auxiliaries for the most frequently used peroxy salt activator tetraacetylethylenediamine.

On the other hand, more reactive peroxy salt activators, such as phthalic anhydride, require more effective protection. Thus, for the preparation of granules having a long shelf life, preproduced activator granules consisting of phthalic anhydride and a carrier material are coated with a coating material comprising polymeric organic compounds, such as polyacrylamide, copolymers of acrylic acid, methacrylic acid or maleic anhydride or starch or cellulose ethers (U.S. Pat. No. 4,009,113).

The stabilization of other sensitive detergent components (enzymes or percarbonates) by coating with polymeric materials is now part of the prior art.

However, the stabilization of reactive peroxycarboxylic acids is still a particular problem today. In the presence of basic detergent components, perfumes and enzymes, redox reactions readily occur, with loss of active oxygen. In addition, oxidation reactions in which valuable detergent components, such as perfumes or enzymes, are destroyed by oxidation readily occur.

A number of proposals have been made for solving the problem.

Thus, European Patent No. 200,163 describes granules having a uniform composition and consisting of 3–50% of an aliphatic peroxycarboxylic acid, 40–95% of a hydratable inorganic salt and 0.2–10% of an organic polymer compound, such as polyacrylic acid.

Granules having a particle size of 0.5 to 2 mm and consisting of 20–65% of a peroxycarboxylic acid, 30–79.5% of an inorganic salt and 0.5–6.5% of a polymeric acid as a binder is described in European Patent No. 256,443. The product can be coated with a coating material in an additional reaction step and thus be protected from reactions with oxidizable detergent components.

Analogous granules and their preparation are described in European Patent No. 272,402. Preproduced peroxycarboxylic acid granules are sprayed, while being agitated, with an aqueous solution of the homo- or copolymer of an unsaturated organic carboxylic acid containing 3–6 carbon atoms, which homo- or copolymer is soluble in an alkaline medium, and are simultaneously or subsequently dried. Preferred preproduced granules consist of 3–50, in particular 7–20, % of a peroxycarboxylic acid, α,ω-diperoxydodecanoic acid being preferred.

Granules of solid, preferably aliphatic, peroxycarboxylic acid particles which are coated with surfactants have also been described (German Offenlegungsschrift 2,737,864). To control an exothermic decomposition reaction, the coated peroxycarboxylic acid particles may furthermore be combined with inorganic sulfates. In addition, additional coating of the granule core with acid-, ester-, ether- or hydrocarbon-containing substances can be carried out for the further protection of the granules. These materials help to prevent moisture from reaching the peroxycarboxylic acid.

European Patent No. 200,163 and European Patent No. 272,402 expressly point out that the experience gained with a peroxycarboxylic acid type can seldom be applied to another type. Optimum granules are accordingly only obtainable by measures tailored to the particular type of peroxycarboxylic acid. Thus, for example, U.S. Pat. No. 3,639,285 discloses that surfactants promote the decomposition of peroxycarboxylic acids whereas in German Offenlegungsschrift 2,737,864 they can readily be used as granulating auxiliaries.

In most granules described to date, the organic peracid used is α,ω-diperoxydodecanoic acid (DPDDA). Because of its thermal instability, it can be converted into granules having a long shelf life only in desensitized form having a content up to 30%.

Granules, having a long shelf life, of relatively reactive peracids having active contents of more than 60% have scarcely been described to date and set high requirements with respect to granulation technology.

The imidoperoxycarboxylic acids (European Patent No. 325,288 and 349,940) represent the development of a group of peroxycarboxylic acids which have substantially higher oxidation and bleaching power than α,ω-diperoxydodecanoic acid. ε-Phthalimidoperoxycaproic acid (PAP) is of particular interest economically and in terms of performance characteristics.

The object of the present invention was to convert this class of compounds into suitable granules having a long shelf life and containing not less than 60% of active constituents.

The object is achieved if the imidoperoxycarboxylic acid is agglomerated with a granulation auxiliary in a mixer and the agglomerated material is then coated with a filmforming agent. In this case, it is possible to dispense with the use of agents for imparting thermal stability to the per acid.

The invention therefore relates to peroxycarboxylic acid granules having a long shelf life and consisting essentially of an imidoperoxycarboxylic acid or its salts of the formula

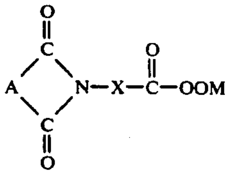

wherein A is a group of the formulae

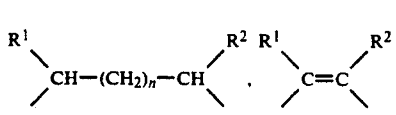

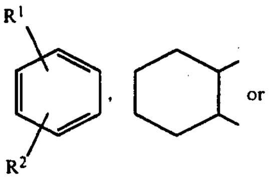

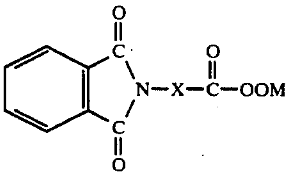

n is the number 0, 1 or 2, $R^1$ is hydrogen, chlorine, bromine, $C_1$–$C_{20}$-alkyl, $C_1$–$C_{20}$-alkenyl, aryl, preferably phenyl, or alkylaryl, preferably $C_1$–$C_4$-alkylphenyl, $R^2$ is hydrogen, chlorine, bromine or a group of the formula $—SO_3M$, $—CO_2M$ or $—OSO_3M$, M is hydrogen, an alkali metal or ammonium ion or one equivalent of an alkaline earth metal ion and X is $C_1$–$C_{19}$-alkylene, preferably $C_3$–$C_{11}$-alkylene, or arylene, preferably phenylene, an inorganic sulfate and/or phosphate salt and/or a nonoxidizable surfactant as granulation auxiliary and a copolymer as a film-forming coating substance, consisting of 0.1-99.9% by weight, preferably 0.1-50% by weight, of one or more monomers of the formula

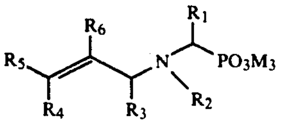

wherein $R_1$ is hydrogen, $C_4$–$C_{10}$-alkyl, phenyl, naphthyl, methylphenyl, hydroxyphenyl, methoxyphenyl, methylnaphthyl, hydroxynaphthyl or methoxynaphthyl, preferably phenyl, $R_2$ is hydrogen or a group of the formula $—CH_2PO_3M_2$, $R_3$, $R_4$ and $R_6$ are hydrogen or methyl, preferably hydrogen, $R_5$ is hydrogen, $C_1$–$C_4$-alkyl or phenyl, preferably hydrogen, and M is hydrogen or a cation, preferably sodium, potassium or ammonium, and 99.9-0.1% by weight, preferably 99.9-50% by weight, of one or more monomers of the formula $$R'_1R'_2C{=}CR'_3X \qquad (II)$$

wherein $R_1'$ is hydrogen or a group of the formula —COOM, $R_2'$ is hydrogen, phenyl or a group of the formula —COOM, $R_3'$ is hydrogen, methyl or a group of the formula -COOM or $—CH_2COOM$, X is a group of the formula —COOM or $R_2'$ and $R_3'$ together form a $C_4$-alkylene radical or $R_1'$ and X together form a group of the formula

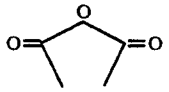

or $R_3'$ and X together form a group of the formula

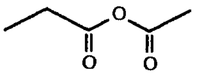

The three essential components of the bleach according to the invention are therefore a peroxycarboxylic acid from the group consisting of the imidoperoxycarboxylic acids, a granulation auxiliary and the coating agent. These are described below, together with components which may be alternatively used.

The Peroxycarboxylic Acid

Suitable peroxycarboxylic acids are the imidoperoxycarboxylic acids of the abovementioned formula. Compounds of this formula wherein A is a group of the formula $—CH_2—(CH_2)_n—CH_2—$ or $—CH_2—CHR_2—CH$-$R^1—$,

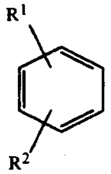

n is the number 0 or 1, $R^1$ is hydrogen, $C_1$–$C_{20}$-alkyl or $C_1$–$C_{20}$-alkenyl, $R^2$ is hydrogen or $CO_2M$, X is Chd 3-$C_{11}$-alkylene and M is hydrogen, an alkali metal or ammonium ion or one equivalent of an alkaline earth metal ion are preferred.

Examples of such preferred compounds which are used in the granules according to the invention are ε-phthalimidoperoxyhexanoic acid (PAP), γ-[dodecylsuccinimido]peroxyhexanoic acid, ε-phthalimidoperoxybutyric acid and γ-trimellitimidoperoxyhexanoic acid or their salts or their mixtures.

The imidoperoxycarboxylic acids can be prepared, for example, according to European Patent No. 349,940, for example by reacting an anhydride of the formula

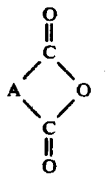

with amino acids of the formula

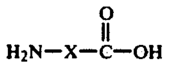

and oxidizing the resulting imidocarboxylic acid with hydrogen peroxide in the presence of a strong acid. In a variant of this process, the anhydride may also be reacted with a lactam in the presence of water under pressure.

The concentration of these per acids in the granules is not less than 60, preferably 65-90%.

The imidoperoxycarboxylic acids used for granulation are usually solid at room temperature and have a melting point above 60° C. They can be used in powder form, in the dry or moist state, for granulation.

The Granulation Auxiliary

The object of the granulation auxiliaries is to form a mechanically stable granule core, and hence the basic skeleton of the actual granules, by agglomeration with the peroxycarboxylic acid.

The granulation auxiliaries to be used according to the invention can be divided into two groups: a) inorganic sulfates and/or phosphates and b) organic compounds having surfactant properties (surfactants). It is essential that these substances cannot be oxidized by the per acid.

Suitable inorganic sulfates/phosphates for the granules are sulfates/phosphates of alkali metals or of alkaline earth metals, which sulfates/phosphates are readily water-soluble and are neutral or acidic after dissolution. Sodium sulfate, sodium bisulfate, potassium sulfate, potassium bisulfate, sodium dihydrogen phosphate and magnesium sulfate are preferably used. Mixtures of the salts may furthermore be used.

Preferably used surfactants are water-soluble anionic sulfates or sulfonates or zwitterionic surfactants. Examples of such compounds are alkali metal or alkaline earth metal salts of alkylsulfates or -sulfonates having an alkyl group of 9 to 22 carbon atoms, which are obtained from natural or synthetically prepared fatty alcohols or from hydrocarbons, such as, for example, paraffin. Other suitable surfactants which may be employed are salts of alkylbenzenesulfonates in which the alkyl group contains 9 to 22 carbon atoms and may be branched or straight-chain. All compounds mentioned may carry ethoxylated groups in the molecule. Preferred compounds are secondary alkanesulfonates (Hostapur® SAS), alkylsulfates and alkylbenzenesulfonates.

The substances can be used in solid or pasty form or as a solution for the granulation. Water is a preferred solvent in this case.

Mixtures of the granulation auxiliaries of group a) with those of group b) in any ratio can be used for the granulation.

The amount of granulation auxiliary in the ready-prepared granules is 5 to 39, preferably 15 to 35, % by weight.

The Film-Forming Coating Substance

Copolymers of an unsaturated, unsubstituted or substituted carboxylic acid and an unsubstituted or substituted alkenylaminomethylenephosphonic acid of the abovementioned formulae, as described in German Patent No. 4,001,420, are used as the film-forming coating substance. These compounds can also be used in partially neutralized form. What is important, however, is that the pH of the compounds is between 2.5 and 7. Possible polymeric compounds are copolymers of acrylic acid or methacrylic acid with allylaminomethylenephosphonic acids or copolymers of acrylic acid, maleic acid and allylaminomethylenephosphonic acid. They can be prepared analogously to the method stated in German Patent No. 4,001,420. The compounds have a mean molecular weight of 00-2,000,000, preferably 2,000-500,000.

The polymeric film formers are preferably applied in aqueous solution to the granule core. Their concentration in the solution is 5-50%, preferably 10-30%.

The amount of film-forming substance in the granules is 1 to 15, preferably 3-12, %.

Additional Components

In many cases, it may be desirable for the granules according to the invention to contain certain additional components. Examples of these are dyes and agents for regulating the pH.

Agents for adjusting the pH are used for changing or maintaining the pH within the granules. Examples of these are citric acid, fatty acids or succinic acid or salts, such as silicates, phosphates or sodium bisulfate.

The Preparation

The imidoperoxycarboxylic acid and the granulation auxiliaries of type a) and/or b) are mixed in a first step so that suitable granules are formed by agglomeration. This may be carried out in a kneader or mixer. The use of a kneader is appropriate wherever thorough mechanical mixing is required due to the addition of a pasty granulation auxiliary. If mixing is carried out in a kneader, for example a Brabender kneader, it has proven advantageous additionally to compact the resulting material in a granulator, for example an Eirich granulator. If inorganic, hydratable salts are used as granulation auxiliaries, it is advantageous if the imidoperoxycarboxylic acid used has a water content of 50 to 5, preferably 35-20%. In this case, mixing can be carried out, for example, in a Lodige mixer. The granules thus obtained require no further compaction after being dried. Granules having a particle size of 0.5 to 2 mm are usually desirable. This can be achieved by sieving the granules. The amount of particles of the correct size is in general 80%. The larger or smaller fractions can be recycled back into the granulation process.

In a second step, the aqueous solution of the film-forming coating substance is sprayed onto the imidoperoxycarboxylic acid granules prepared in this manner. To achieve as complete a coat as possible, the granules must be agitated during the spraying process. A particularly preferred form is therefore spraying on in a fluidized bed, in which case the coated granules can be simultaneously dried by heating the fluidizing air. Spraying is effected in such a way that further agglomeration is prevented. The particle size and particle size distribution are therefore not significantly influenced by the coating process. In addition, dyes and agents for regulating the pH may be dissolved in the aqueous polymer solution. Depending on the spraying process, the coated granules must also be dried.

The granules according to the invention are white, freeflowing granules having a bulk density between 500 and 1,200 kg/m$^3$, preferably between 550 and 1,100 kg/m$^3$.

An aftertreatment, for example by pressing to give tablets or larger agglomerates, is possible and is advantageous for particular intended uses.

Use

The granules according to the invention can in general be used wherever the imidoperoxycarboxylic acids are employed as oxidizing agents, bleaches and disinfectants. In particular, these granules can be used in pulverulent detergents, cleaning agents and disinfectants. Another preferred field of use is in the hygiene sector, for example as an additive to disinfectants or cleaning agents for hard surfaces, sanitary cleaners, dental hygiene agents or stain removing salts. The dissolution rate of the peroxycarboxylic acid is only insignificantly affected, if at all, by the granulation. At 20° C., more than 70% of the available active oxygen is available for bleaching, oxidation or disinfection within 5 minutes. Hence, an effective action of the per acid is achieved at as low as room temperature.

For this purpose, the granules can be compounded with other solid active substances required in the relevant field of use. In particular, it should be pointed out that combinations with other bleaches, such as peroxy salts, peroxy salt/activator systems or other peroxycarboxylic acids are also preferred in some cases.

Anionic, nonionic or cationic surfactants, builder systems based on zeolites, sheet silicates or phosphates, cobuilders, optical brighteners and perfume substances may be mentioned as additional components for use in detergents and cleaning agents.

EXAMPLE 1

100 g of moist ε-phthalimidoperoxyhexanoic acid (composition: 70% of ε-phthalimidoperoxyhexanoic acid, 30% of water) and 300 g of anhydrous sodium sulfate are mixed for 3 minutes at 140 revolutions per minute in a 2.5 l Lodige mixer and then dried in a vacuum drying oven at 40° C. until the weight remains constant. 86% of particles of the correct size of between 0.5 and 2.00 mm are obtained after sieving. 500 g of particles of the correct size are placed in a fluidized-bed unit and fluidized by a stream of about 50 m$^3$/h of air at 28° C. At the same time, an aqueous 12.7% strength copolymer solution, which is prepared according to German Patent No. 4,001,420, from 90 g of acrylic acid and 10 g of allylaminobismethylenephosphonic acid, is sprayed on through a nozzle in the base. 221 g of copolymer solution are sprayed onto the agitated granules in the course of 18 minutes. Drying in a vacuum drying oven at 40° C. results in 523 g of coated granules having the following composition: 64.8% of ε-phthalimidoperoxyhexanoic acid (corresponding to an active oxygen content of 3.74%), 28.4% of $Na_2SO_4$ [sulfate determination by the barium chloride method] and 5.3% of a copolymer of 90 g of acrylic acid and 10 g of allylaminobismethylenephosphonic acid. The bulk density is 530 g/l.

EXAMPLE 2

140 g of ε-phthalimidoperoxycaproic acid and 47 g of Hostapur SAS 60 (Hoechst) are kneaded for 5 minutes at 120 revolutions per minute in a 0.3 l Brabender kneader. The total material from 11 kneader batches is then granulated in a 12 liter Eirich mixing granulator for 9 minutes at 900 revolutions per minute and then dried in a vacuum drying oven at 40° C. until the weight remains constant. After sieving, 80% of particles of the correct size of between 0.5 and 2.00 mm are obtained. 518 g of particles of the correct size are placed in a fluidized-bed unit and fluidized by a stream of about 50 m$^3$/h of air at 20° C. At the same time, an aqueous 12.7% strength copolymer solution, which is prepared according to German Patent No. 4,001,420 from 90 g of acrylic acid and 10 g of allylaminobismethylenephosphonic acid, is sprayed on through a nozzle in the base. 130 g of copolymer solution are sprayed onto the agitated granules in the course of 24 minutes. Drying in a vacuum drying oven at 40° C. gives 526 g of coated granules having the following composition: 73.3% of ε-phthalimidoperoxyhexanoic acid (corresponding to an active oxygen content of 4.23%), 19.7% of Hostapur ® SAS (secondary alkanesulfonate) (100% pure) [determined by two-phase titration according to Epton] and 3.1% of a copolymer of 90 g of acrylic acid and 10 g of allylaminobismethylenephosphonic acid. The bulk density is 558 g/l.

EXAMPLE 3

Washing Tests

PAP powder (content:96%) and the granules A and B according to the invention as well as granules based on lauric acid were used for the washing tests:

Granules A: 64.8% of PAP, 28.4% of $Na_2SO_4$ and 5.3% of a copolymer of acrylic acid and allylaminobismethylenephosphonic acid (prepared according to German Patent No. 4,001,420)

Granules B: 73.3% of PAP, 19.7% of SAS and 3.1% of a copolymer of acrylic acid and allylaminobis methylenephosphonic acid (prepared according to German Patent 4,001,420)

Granules C: PAP granules not according to the invention and based on lauric acid.

The washing tests were carried out in a Launder-0-Meter using test soiling in the form of tea on cotton (WFK) and red wine on cotton (EMPA, St. Gallen, Switzerland), the water hardness being 15° German hardness. 1.5 g/l of phosphate-free standard detergent (WFK) were used as the detergent. The amount of bleach systems was chosen so that in each case theoretically 25 mg of active oxygen were available per liter of wash liquor. The washing temperature was 20° C. and the washing time 30 minutes.

The bleaching power was determined as the increase in reflectance for the various test fabrics. The evaluation was carried out in a conventional manner.

| | Reflectance [%] | |
|---|---|---|
| Bleaching system | Tea | Red wine |
| PAP powder | 65.5 | 55.6 |
| Granules A | 65.2 | 55.3 |
| Granules B | 65.6 | 56.3 |
| Granules C | 60.4 | 51.8 |

The wash results show that the active oxygen release capacity of the per acid is not influenced at low temperature by the granulation according to the invention. On the other hand, granules C not according to the invention lead to substantially poorer bleaching results, owing to reduced solubility in cold water.

EXAMPLE 4

Storage Tests

Determination of the Shelf Life 100 mg of each of the granules are mixed with 900 mg of phosphate-free standard detergent and stored in open glass bottles at 20° C./60% atmospheric humidity, 38° C./30% atmospheric humidity and 38° C./80% atmospheric humidity. After one week in each case, the active oxygen content of a total sample is determined and the result expressed relative to the initial value.

Shelf Life

Retention of active oxygen as a percentage of the original content:

| Condition | Storage time/weeks 1 | 2 | 3 | 6 |
|---|---|---|---|---|
| | Granules A | | | |
| 20° C./60% LF | 95 | 92 | 95 | 92 |
| 38° C./30% LF | 100 | 97 | 95 | 95 |
| | Granules B | | | |
| 20° C./60% LF | 100 | 99 | 97 | 99 |
| 38° C./30% LF | 99 | 97 | 96 | 93 |

We claim:

1. Stable peroxycarboxylic acid granules, consisting essentially of (1) an imidoperoxycarboxylic acid or a salt thereof of the formula

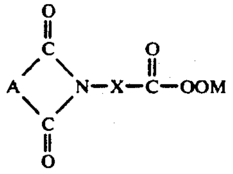

wherein A is selected from the group consisting of the formula

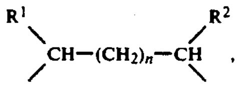 , 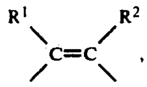 ,

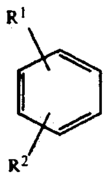 , 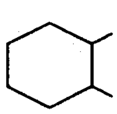 and

-continued

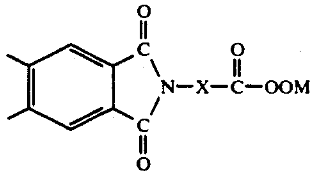

n is selected from the group consisting of 0, 1 and 2, $R^1$ is selected from the group consisting of hydrogen, chlorine, bromine, $C_1$–$C_{20}$-alkyl, $C_1$–$C_{20}$-alkenyl, aryl, and alkylaryl, $R^2$ is selected from the group consisting of hydrogen, chlorine, bromine, $-SO_3M$, $-CO_2M$ and $-OSO_3M$, M is selected from the group consisting of hydrogen, alkali metal, ammonium ion and one equivalent of an alkaline earth metal ion an X is selected from the group consisting of $C_1$–$C_{19}$-alkylene and arylene, (2) a granulation auxiliary selected from the group consisting of an inorganic sulfate, a phosphate salt, a non-oxidizable surfactant and mixtures thereof and (3) a copolymer as a film-forming coating substance consisting of 0.1–99.9% by weight, of one or more monomers of the formula

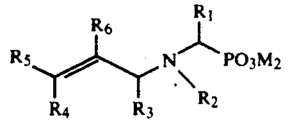

(I)

wherein $R_1$ is selected from the group consisting of hydrogen, $C_4$–$C_{10}$-alkyl, phenyl, naphthyl, methylphenyl, hydroxyphenyl, methoxyphenyl, methylnaphthyl, hydroxynaphthyl and methoxynaphthyl, $R_2$ is hydrogen or a group of the formula $-CH_2PO_3M_2$, $R_3$, $R_4$ and $R_6$ are hydrogen or methyl $R_5$ is hydrogen, $C_1$–$C_4$-alkyl or phenyl, and M is hydrogen or a cation, and 99.9–0.1% by weight of one or more monomers of the formula $$R'_1R'_2C{=}CR'_3X \quad (II)$$

wherein $R_1'$ is hydrogen or a group of the formula $-COOM$, $R_2'$ is selected from the group consisting of hydrogen, phenyl, and $-COOM$, $R_3'$ is selected from the group consisting of hydrogen, methyl, $-COOM$ and $-CH_2COOM$, X is a group of the formula $-COOM$ or $R_2'$ and $R_3'$ together form a $C_4$-alkylene radical or $R_1'$ and X together form a group of the formula

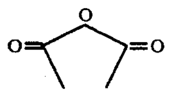

or $R_3'$ and X together form a group of the formula

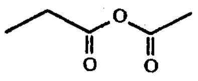

2. Stable peroxycarboxylic acid granules as claimed in claim 1, wherein the peroxycarboxylic acid used is a compound of the formula

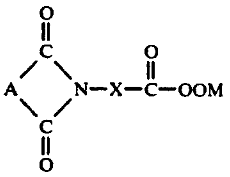

or a salt thereof, wherein

A is selected from the group consisting of the formula $-CH_2-(CH_2)_n-CH_2-$, $-CH_2-CHR^1-$and

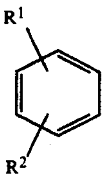

n is the number 0 or 1, $R^1$ is selected from the group consisting of hydrogen, $C_1-C_{20}$-alkyl, and $C_1$-$C_{20}$-alkenyl, $R^2$ is hydrogen or $CO_2M$, X is $C_3$-$C_{11}$-alkylene and M is selected from the group consisting of hydrogen, an alkali metal, ammonium ion, and one equivalent of an alkaline earth metal ion.

3. Stable peroxycarboxylic acid granules as claimed in claim 1, wherein the granulation auxiliary used is selected from the group consisting of sodium sulfate, alkylbenzenesulfonate, alkanesulfonate and alkylsulfate.

4. Stable peroxycarboxylic acid granules as claimed in claim 1, wherein the polymeric compounds used are copolymers of acrylic acid or methacrylic acid with allyaminomethylenephosphonic acid or copolymers of acrylic acid, maleic acid, and alkylaminomethylene phosphonic acid.

5. Stable peroxycarboxylic acid granules as claimed in claim 1, wherein the amount of imidoperoxycarboxylic acid is not less than 60%.

6. Stable peroxycarboxylic acid granules as claimed in claim 1, wherein $R^1$ is selected from the group consisting of phenyl and $C_1$-$C_4$-alkylphenyl, X is selected from the group consisting of $C_3$-$C_{11}$-alkylene and phenylene, $R_1$ is phenyl, $R_3$, $R_4$, $R_5$ and $R_6$ are hydrogen, and M is selected from the group consisting of sodium, potassium and ammonium.

7. Stable peroxycarboxylic acid granules as claimed in claim 1, wherein there is 0.1-50% by weight of one or more monomers of the formula

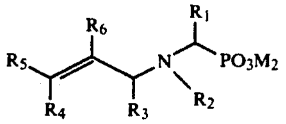

(I)

and 99.9-50% by weight of one or more of the monomers of formula II.

8. Stable peroxycarboxylic acid granules as claimed in claim 1, wherein the monomers of formula (II) are polymeric coating substance used is selected from the group consisting of acrylic acid, methacrylic acid, maleic acid, fumaric acid, and itaconic acid.

9. Stable peroxycarboxylic acid granules as claimed in claim 1, wherein the amount of granulation auxiliary in the ready-prepared granules is 5 to 39%.

10. Stable peroxycarboxylic acid granules as claimed in claim 9, wherein the amount of granulation and auxiliary in the ready-prepared granules is 15-35%.

11. Stable peroxycarboxylic acid granules as claimed in claim 1, wherein the amount of polymeric coating substance is 1 to 15%.

12. Stable peroxycarboxylic acid granules as claimed in claim 11, wherein the amount of polymeric coating substance is 3 to 12%.

13. A bleach, oxidizing agent, disinfectant, detergent or cleaning agent comprising the stable peroxycarboxylic acid granules as claimed in claim 1.

14. Stable peroxycarboxylic acid granules as claimed in claim 1, wherein the granules have a retention of active oxygen as a percentage of the original content after 6 weeks being at least 92%.

* * * * *